(12) United States Patent
Omote et al.

(10) Patent No.: US 8,627,653 B2
(45) Date of Patent: Jan. 14, 2014

(54) EXHAUST PURIFICATION APPARATUS

(75) Inventors: Hiroshi Omote, Osaka (JP); Shusuke Okada, Osaka (JP); Yuuji Kawabata, Osaka (JP)

(73) Assignee: Yanmar Co., Ltd., Osaka (JP)

(*) Notice: Subject to any disclaimer, the term of this patent is extended or adjusted under 35 U.S.C. 154(b) by 234 days.

(21) Appl. No.: 13/147,053

(22) PCT Filed: Nov. 9, 2009

(86) PCT No.: PCT/JP2009/069050
§ 371 (c)(1),
(2), (4) Date: Jul. 29, 2011

(87) PCT Pub. No.: WO2010/089924
PCT Pub. Date: Aug. 12, 2010

(65) Prior Publication Data
US 2012/0023914 A1    Feb. 2, 2012

(30) Foreign Application Priority Data
Feb. 3, 2009 (JP) ................................. 2009-023015

(51) Int. Cl.
*F01N 3/00* (2006.01)
(52) U.S. Cl.
USPC ........................................................ 60/295
(58) Field of Classification Search
USPC .................................. 60/286, 295, 297, 301
See application file for complete search history.

(56) References Cited

U.S. PATENT DOCUMENTS

| | | | |
|---|---|---|---|
| 2007/0274877 A1 | 11/2007 | Bush et al. | |
| 2010/0132333 A1 | 6/2010 | Endo et al. | |
| 2010/0132348 A1 | 6/2010 | Kowada | |
| 2010/0186382 A1 * | 7/2010 | Schroeder et al. | .............. 60/286 |

FOREIGN PATENT DOCUMENTS

| | | |
|---|---|---|
| DE | 37 28 557 A1 | 3/1989 |
| GB | 2 381 218 A | 4/2003 |
| JP | 2005-155404 | 6/2005 |
| JP | 2007-327377 | 12/2007 |
| JP | 2008-138654 | 6/2008 |

(Continued)

OTHER PUBLICATIONS

International Search Report for International Application No. PCT/JP2009/069050 mailed Jan. 26, 2009, 4 pages.

(Continued)

*Primary Examiner* — Thomas Denion
*Assistant Examiner* — Mickey France
(74) *Attorney, Agent, or Firm* — Sterne, Kessler, Goldstein & Fox P.L.L.C.

(57) ABSTRACT

An exhaust purification apparatus which comprises: a first processing unit for removing particulate matter; a second processing unit for reducing nitrogen oxide; a communication pipe for guiding exhaust from an exhaust outlet of the first processing unit to an exhaust inlet of the second processing unit; and a reducing agent supply unit on the communication pipe. The first and second processing units are arranged in parallel such that the exhaust outlet and the exhaust inlet are on the sides facing each other. The communication pipe is arranged between the first and second processing units where the processing units are closest to each other such that the upstream part of the communication pipe extends from the exhaust outlet along the outer circumferential surface of the first processing unit and the downstream part of the communication pipe extends along the outer circumferential surface of the second processing unit to the exhaust inlet.

4 Claims, 9 Drawing Sheets

(56) References Cited

FOREIGN PATENT DOCUMENTS

| | | | |
|---|---|---|---|
| JP | 2008196328 | * | 8/2008 |
| JP | 2008196328 A | * | 8/2008 |
| JP | 2008-208727 | | 9/2008 |
| JP | 2008-215286 | | 9/2008 |
| JP | 2008-248746 | | 10/2008 |
| JP | 2008-274851 | | 11/2008 |
| JP | 2009-036041 | | 2/2009 |
| JP | 2009-228484 | | 10/2009 |

OTHER PUBLICATIONS

Notification of the First Office Action for Chinese Patent Application No. 200980155910.4, Chinese Patent Office, mailed Feb. 4, 2013, 14 pages (with English translation).

* cited by examiner

EXHAUST PURIFICATION APPARATUS

TECHNICAL FIELD

The present invention relates to an art of an exhaust purification apparatus of a diesel engine.

BACKGROUND ART

Exhaust gas discharged from a diesel engine includes particle matter represented by soot and the like and nitrogen oxide represented by nitrogen monoxide and the like. As a means for removing the particle matter, a particle matter filter device which filters the exhaust gas with a filter carrier is known. As a means for removing the nitrogen oxide, a nitrogen oxide reductor is known as what reduces the nitrogen oxide with a reduction catalytic carrier after supplying urea water to the exhaust gas.

In the case that the particle matter filter device and the nitrogen oxide reductor are employed as an exhaust purification apparatus so as to purify the exhaust gas discharged from the diesel engine, firstly, the particle matter in the exhaust gas is removed by the particle matter filter device, and then the nitrogen oxide is reduced by the nitrogen oxide reductor. When these devices are arranged straight in an exhaust path, the path imperatively becomes long. Accordingly, there is a construction that the devices are arranged in parallel to each other and constructed integrally (for example, see the Patent Literatures 1 and 2).

However, when the particle matter filter device and the nitrogen oxide reductor are arranged in parallel to each other, it is difficult to secure the mixing time from the supply of urea water to the exhaust gas until the urea water and the exhaust gas are mixed uniformly. It is also difficult to introduce the exhaust gas including the urea water into the reduction catalytic carrier constituting the nitrogen oxide reductor uniformly without any bias. Accordingly, a perforated plate or the like must be arranged in the exhaust path, whereby construction of an exhaust purification apparatus must be complex.

It is necessary to control the supply amount of urea water corresponding to the discharge amount of exhaust gas from the diesel engine. However, it is difficult to mix the suitable amount of urea water exhaust gas and introduce them into the nitrogen oxide reductor.

Patent Literature 1: the Japanese Patent Laid Open Gazette 2005-155404

Patent Literature 2: the Japanese Patent Laid Open Gazette 2008-138654

DISCLOSURE OF INVENTION

Problems to be Solved by the Invention

Then, the purpose of the present invention is to provide an exhaust purification apparatus having small and simple construction in which urea water and exhaust gas can be mixed uniformly and the exhaust gas including the urea water can be introduced into a reduction catalytic carrier constituting a nitrogen oxide reductor uniformly without any bias.

Means for Solving the Problems

Explanation will be given on means of the present invention for solving the problems.

According to the first mode of the present invention, an exhaust purification apparatus provided in an exhaust path of a diesel engine includes a first processing unit which is a substantially cylindrical exhaust path provided therein with a filter carrier and removes mainly particulate matter from exhaust gas of the diesel engine, a second processing unit which is a substantially cylindrical exhaust path provided therein with a reduction catalytic carrier and removes mainly nitrogen oxide from the exhaust gas after passing through the first processing unit, a communication pipe which guides the exhaust gas from an exhaust outlet provided in a peripheral surface of the first processing unit to an exhaust inlet provided in a peripheral surface of the second processing unit, and a reducing agent supply unit which supplies reducing agent to the exhaust gas so as to reduce the nitrogen oxide. The first processing unit and the second processing unit are provided in parallel to each other while the exhaust outlet faces the exhaust inlet. The upstream side of the communication pipe is provided from the exhaust outlet of the first processing unit along the outer peripheral surface of the first processing unit, the communication pipe passes through a space between the first processing unit and the second processing unit at which the first processing unit is the most close to the second processing unit, and the downstream side of the communication pipe is connected to the exhaust inlet of the second processing unit along the outer peripheral surface of the second processing unit. The reducing agent supply unit is provided in the communication pipe.

According to the second mode of the present invention, in the engine of the first mode, the axis of the communication pipe at a connection part of the upstream side of the communication pipe and the first processing unit does not cross the axis of the first processing unit.

According to the third mode of the present invention, in the engine of the first mode, the axis of the communication pipe at a connection part of the downstream side of the communication pipe and the second processing unit does not cross the axis of the second processing unit.

According to the fourth mode of the present invention, in the engine of the first mode, the communication pipe has a reduced diameter portion downstream the reducing agent supply unit.

According to the fifth mode of the present invention, in the engine of the fourth mode, the reduced diameter portion of the communication pipe is arranged at a position at which the first processing unit is the most close to the second processing unit.

According to the sixth mode of the present invention, in the engine of the first mode, an auxiliary reducing agent supply unit which supplies a reducing agent to the exhaust gas so as to reduce the nitrogen oxide is provided. The reducing agent supply unit is provided at the upstream side of the communication pipe, and the auxiliary reducing agent supply unit is provided at the downstream side of the communication pipe.

Effect of the Invention

The present invention constructed as the above brings the following effects.

According to the first mode of the present invention, the exhaust purification apparatus can be constructed small and simple, and the mixing of the exhaust gas and the urea water supplied thereto can be promoted.

According to the second mode of the present invention, the exhaust purification apparatus can be constructed small and simple, and the mixing of the exhaust gas and the urea water supplied thereto can be promoted at the time of low output driving of the diesel engine.

According to the third mode of the present invention, the exhaust purification apparatus can be constructed small and simple, and the mixing of the exhaust gas and the urea water supplied thereto can be promoted. By a turning flow, exhaust gas can be introduced into the reduction catalytic carrier uniformly without any bias.

According to the fourth mode of the present invention, the exhaust purification apparatus can be constructed small and simple, and the mixing of the exhaust gas and the urea water supplied thereto can be promoted further. By the turning flow, exhaust gas can be introduced into the reduction catalytic carrier uniformly without any bias.

According to the fifth mode of the present invention, the exhaust purification apparatus can be constructed even smaller, and the mixing of the exhaust gas and the urea water supplied thereto can be promoted further. By the turning rotational flow, exhaust gas can be introduced into the reduction catalytic carrier uniformly without any bias.

According to the sixth mode of the present invention, the exhaust purification apparatus can be constructed small and simple, and the exhaust gas can be mixed with the urea water supplied thereto regardless of the driving state of the diesel engine. The urea water of the amount suitable for the discharge amount of nitrogen oxide can be mixed with exhaust gas and then introduced into the reduction catalytic carrier.

BRIEF DESCRIPTION OF DRAWINGS

FIG. 1 (A) is a plan view of an exhaust purification apparatus according to a first embodiment of the present invention. FIG. 1 (B) is a side view of the exhaust purification apparatus.

FIG. 3 (A) is a plan view of an exhaust purification apparatus according to a second embodiment of the present invention. FIG. 3 (B) is a side view of the exhaust purification apparatus.

FIG. 5 (A) is a plan view of an exhaust purification apparatus according to a third embodiment of the present invention. FIG. 5 (B) is a side view of the exhaust purification apparatus.

FIGS. 9 (A), 9 (B) and 9 (C) are side views of exhaust purification apparatuses according to other embodiments of the present invention.

THE BEST MODE FOR CARRYING OUT THE INVENTION

Next, explanation will be given on the embodiments of the present invention.

Figure 1:
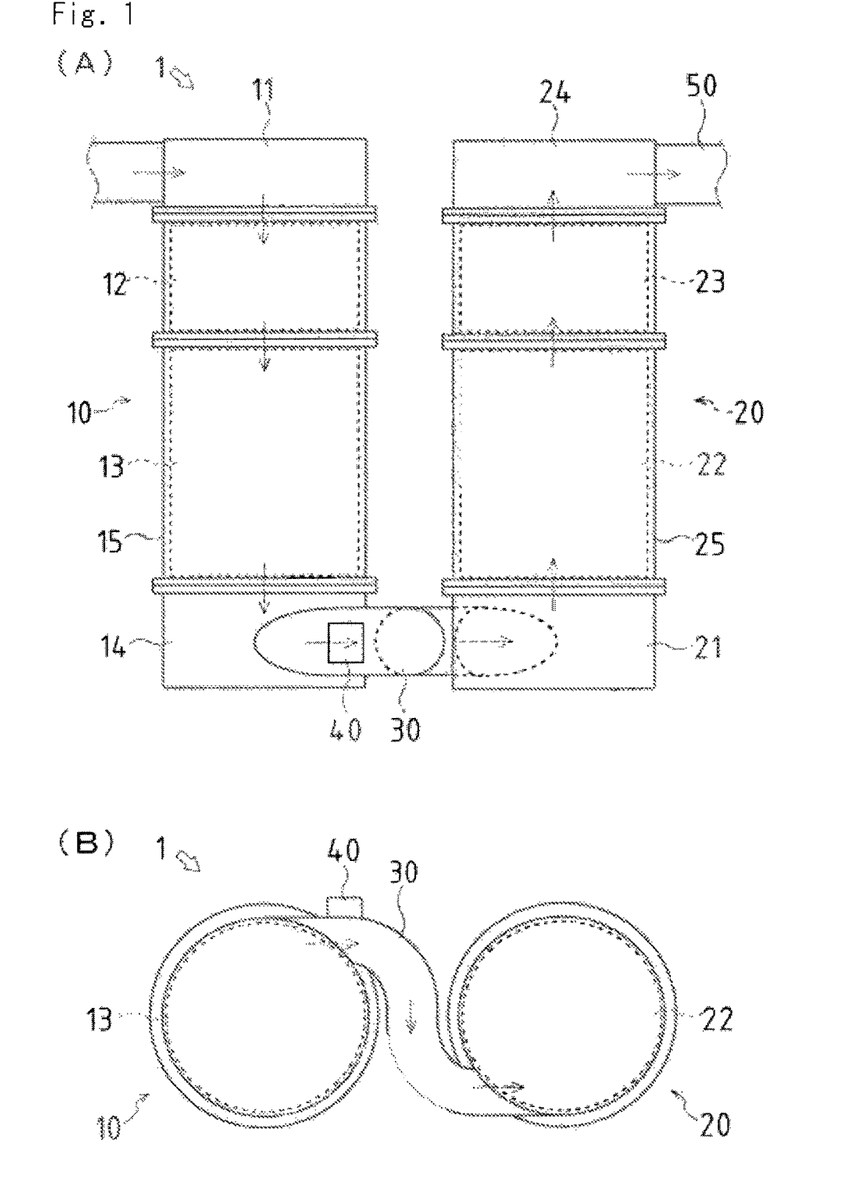
Figure 2:
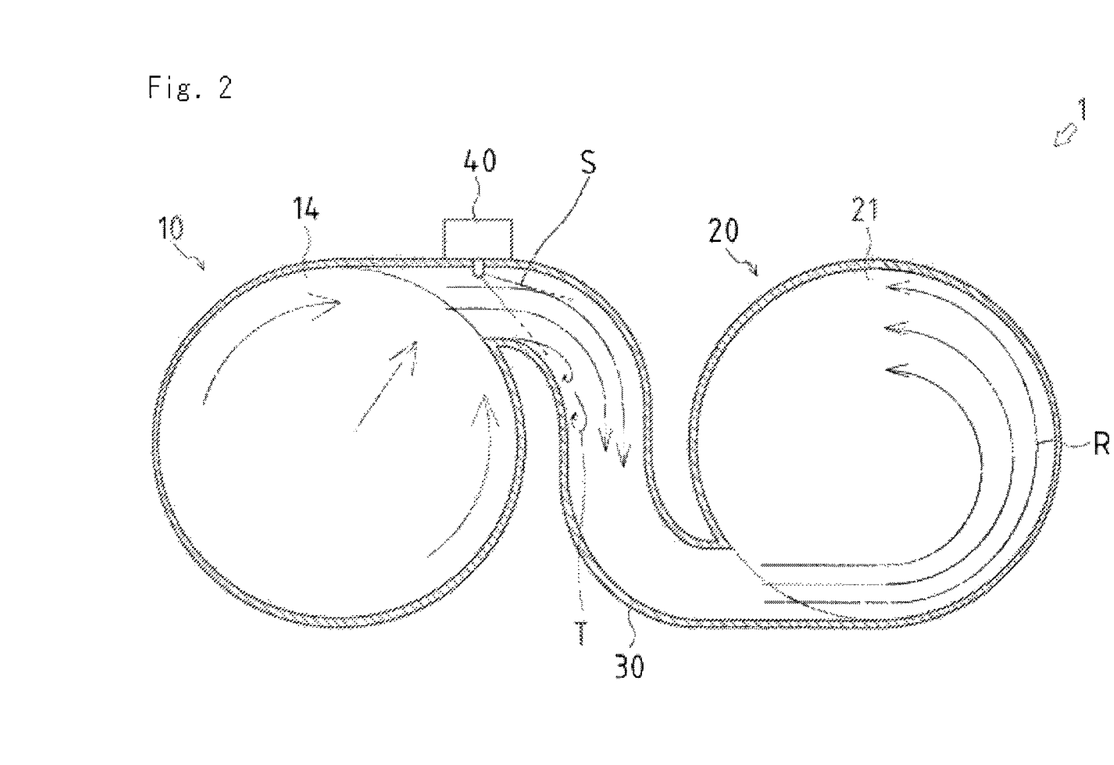
FIG. 2 is a sectional side view of the exhaust purification apparatus according to the first embodiment of the present invention.

FIG. 1 (A) is a plan view of an exhaust purification apparatus 1 according to a first embodiment of the present invention. FIG. 1 (B) is a side view of the exhaust purification apparatus 1. FIG. 2 is a sectional side view of the first embodiment of the present invention. Arrows in the drawings show flows of exhaust gas.

As shown in FIG. 1 (A), the exhaust purification apparatus 1 is provided in an exhaust path of a diesel engine, and mainly includes a first processing unit 10 which is a particulate matter filter, a second processing unit 20 which is a nitrogen oxide reductor, a communication pipe 30 which guides exhaust gas from the first processing unit 10 to the second processing unit 20, and a reducing agent supply unit 40 which is provided in the communication pipe 30 and supplies urea water S to the exhaust gas.

Exhaust gas discharged from the diesel engine is guided firstly to the first processing unit 10 and particulate matter is removed. The exhaust gas in which the particulate matter is removed is guided through the communication pipe 30 to the second processing unit 20 arranged in parallel to the first processing unit 10. At this time, the urea water S of a proper quantity is supplied from the reducing agent supply unit 40 provided in the communication pipe 30, whereby reduction reaction of nitrogen oxides occurs in the second processing unit 20. Accordingly, the exhaust gas in which the particulate matter is removed and the nitrogen oxides are reduced is exhausted to the atmosphere through a tail pipe 50.

The first processing unit 10 mainly includes a cylindrical first casing 15, an oxidation catalytic carrier (hereinafter, referred to as "DOC") 12 formed by a substrate of silicon carbide or the like on which a catalyst such as platinum is carried, and a filter carrier (hereinafter, referred to as "DPF") 13 formed by a substrate of silicon carbide or the like and filtering exhaust gas passing therethrough. The DOC 12 and the DPF 13 are provided in a middle portion of an exhaust passage formed in the first casing 15, and the DOC 12 is arranged at the upstream side and the DPF 13 is arranged at the downstream side.

The first processing unit 10 is constructed linearly while the lengthwise direction thereof is in agreement with the flowing direction of exhaust gas flowing in the exhaust passage of the first processing unit 10. An exhaust inlet is formed at the upstream side of the first processing unit 10, whereby exhaust gas discharged from the diesel engine can be introduced into an inlet chamber 11 of the first processing unit 10. An exhaust outlet is formed at the downstream side of the first processing unit 10, whereby the exhaust gas passing through the inlet chamber 11, the DOC 12 and the DPF 13 in order can be discharged through an exhaust outlet provided in an outlet chamber 14 to the communication pipe 30.

The DOC 12 oxidizes and removes CO (carbon monoxide), HC (carbon hydride) and SOF (soluble organic fraction) of particle matter (hereinafter, referred to as "PM") in the exhaust gas discharged from the diesel engine. Furthermore, the DOC 12 oxidizes much of the NO (nitrogen monoxide) included in exhaust gas of the diesel engine so as to change it to $NO_2$ (nitrogen dioxide).

The DPF 13 collects soot constituting PM so as to filter exhaust gas and oxidize and remove the collected soot. In this embodiment, the DPF 13 whose substrate is silicon carbide is employed, and soot included in exhaust gas is collected at the time that the exhaust gas passes through fine holes formed in the DPF 13. The collected soot is oxidized with oxygen included in the exhaust gas and $NO_2$ generated in the DOC 12 on condition that the oxidization reaction can be progressed at the temperature of the exhaust gas.

Accordingly, the first processing unit 10 in this embodiment continuously collects and oxidizes PM included in exhaust gas. However, the first processing unit may alternatively be intermittent regeneration type in which collected soot is oxidized compulsorily by an electric heater or the like only at the time that the collected soot is accumulated. The DPF 13 may alternatively be constructed by cordierite or laminated heat resisting steel as a substrate, and the material and construction thereof are not limited.

The second processing unit 20 mainly includes a cylindrical second casing 25, a reduction catalytic carrier (hereinafter, referred to as "SCR carrier") 22 formed by a substrate of cordierite or the like on which a catalyst such as zeolite is carried, and a DOC 23 formed by a substrate of silicon carbide or the like on which a catalyst such as platinum is carried. The SCR carrier 22 and the DOC 23 are provided in a middle portion of an exhaust passage formed in the second casing 25, and the SCR carrier 22 is arranged at the upstream side and the DOC 23 is arranged at the downstream side. The second processing unit 20 constitutes a SCR system with the reducing agent supply unit 40 discussed later, a control device and supply pump (not shown) and the like.

The second processing unit 20 is constructed linearly while the lengthwise direction thereof is in agreement with the flowing direction of exhaust gas flowing in the exhaust passage of the second processing unit 20. An exhaust inlet is formed at the upstream side of the second processing unit 20, whereby the exhaust gas guided by the communication pipe 30 can be introduced into an inlet chamber 21 of the second processing unit 20. An exhaust outlet is formed at the downstream side of the second processing unit 20, whereby the exhaust gas passing through the inlet chamber 21, the SCR carrier 22 and the DOC 23 in order can be discharged through an exhaust outlet provided in an outlet chamber 24 to the tail pipe 50.

The SCR carrier 22 reduces nitrogen oxide included in exhaust gas with ammonia as a reducer. The ammonia is generated by hydrolysis of the urea water S supplied from the reducing agent supply unit 40 discussed later to the exhaust gas, and the SCR carrier 22 changes the nitrogen oxide to $N_2$ and $H_2O$ with the ammonia by the following reduction reactions.

$6NO+4NH_3 \rightarrow 5N_2+6H_2O$ $4NO+4NH_3+O_2 \rightarrow 4N_2+6H_2O$ $6NO_2+8NH_3 \rightarrow 7N_2+12H_2O$ $2NO_2+4NH_3+O_2 \rightarrow 3N_2+6H_2O$ $NO+NO_2+2NH_3 \rightarrow 2N_2+3H_2O$ The DOC 23 arranged at the downstream of the SCR carrier 22 oxidizes the ammonia which is surplus in the reduction reactions in the SCR carrier 22 so as to make the ammonia harmless, thereby preventing the ammonia from being discharged to the atmosphere.

Accordingly, the second processing unit 20 in this embodiment reduces the nitrogen oxide with the ammonia generated by hydrolysis of the urea water S as the reducing agent. However, a so-called occlusion reducing agent may alternatively be employed so that hydrocarbon fuel is supplied to exhaust gas and nitrogen oxide adsorbed to a catalyst carrier.

The first processing unit 10 and the second processing unit 20 are arranged on the same plane in parallel to each other for a predetermined interval. The lengthwise direction of the first processing unit 10 is substantially the same as that of the second processing unit 20. At least the exhaust outlet provided in the outlet chamber 14 of the first processing unit 10 and the exhaust inlet provided in the inlet chamber 21 of the second processing unit 20 are arranged on the same plane perpendicular to the axes of the first processing unit 10 and the second processing unit 20.

The exhaust outlet of the first processing unit 10 is arranged at the position of the first casing 15 facing the second processing unit 20. The exhaust inlet of the second processing unit 20 is arranged at the position of the second casing 25 facing the first processing unit 10. Namely, the exhaust outlet of the first processing unit 10 faces the exhaust inlet of the second processing unit 20.

As shown in FIG. 1 (B), each of the exhaust outlet of the first processing unit 10 and the exhaust inlet of the second processing unit 20 is not arranged on a straight line perpendicular to the axes of the first processing unit 10 and the second processing unit 20, and the vertical positions of the exhaust outlet of the first processing unit 10 is shifted from that of the exhaust inlet of the second processing unit 20.

The communication pipe 30 is a cylindrical member which guides the exhaust gas passing through the DOC 12 and the DPF 13 constituting the first processing unit 10 to the second processing unit 20. The communication pipe 30 connects the exhaust outlet of the first processing unit 10 to the exhaust inlet of the second processing unit 20 while bending between the first processing unit 10 and the second processing unit 20. The communication pipe 30 is arranged in a space formed between the first processing unit 10 and the second processing unit 20. The inner diameter of the communication pipe 30 is set at a predetermined value smaller than the diameter of each of the first casing 15 and the second casing 25.

The upstream side of the communication pipe 30 is extended from the exhaust outlet provided in the outlet chamber 14 of the first processing unit 10 along the tangential direction of the first processing unit 10 while the axis of the communication pipe 30 at the connection part of the communication pipe 30 and the first processing unit 10 does not cross the axis of the first processing unit 10.

The communication pipe 30 bends along the outer perimeter of the first processing unit 10, and the middle portion of the communication pipe 30 passes through the space between the first processing unit 10 and the second processing unit 20 at which the first processing unit 10 is the most close to the second processing unit 20.

The downstream side of the communication pipe 30 bends along the outer perimeter of the second processing unit 20. The downstream side of the communication pipe 30 is shifted to the position along the tangential direction of the second processing unit 20 while the axis of the communication pipe 30 does not cross the axis of the second processing unit 20, and is connected to the exhaust inlet provided in the inlet chamber 21 of the second processing unit 20. Namely, as shown in FIG. 2, the communication pipe 30 forms an exhaust passage S-like shaped when viewed in side.

The reducing agent supply unit 40 is provided in the communication pipe 30 and supplies the urea water S to exhaust gas. The reducing agent supply unit 40 is constructed by a nozzle and the like, provided at the upstream side of the communication pipe 30, and arranged in the vicinity of the exhaust outlet of the first processing unit 10. Supply amount of the urea water S from the reducing agent supply unit 40 is controlled by a control device (not shown) corresponding to discharge amount of nitrogen oxide from the diesel engine. The reducing agent supply unit 40 may supply the urea water S with air by employing compressed air or may supply only the urea water S by a pump, and the construction of the reducing agent supply unit 40 is not limited in the present invention. Also, the direction of supply of the urea water S about the flow of exhaust gas is not limited.

Accordingly, by bending the communication pipe 30 S-like shaped, the distance of flow of exhaust gas in the limited space between the first processing unit 10 and the second processing unit 20 can be extended. By supplying the urea water S from the upstream side of the communication pipe 30, mixing time until the exhaust gas including the urea water S is introduced into the SCR carrier 22 is extended. Accordingly, the mixing of the exhaust gas and the urea water S supplied thereto can be promoted with small and simple construction.

The exhaust gas guided from the communication pipe 30 to the inlet chamber 21 of the second processing unit 20 is guided from the tangential direction of the second processing unit 20 along the inner wall of the inlet chamber 21 which is cylindrical, whereby a turning flow R is generated in the inlet chamber 21. Accordingly, the exhaust gas can be mixed with the urea water S further so that the exhaust gas does not go straight to the SCR carrier 22, whereby the bias of the exhaust gas guided to the SCR carrier 22 can be suppressed.

Furthermore, when the diesel engine is at low output driving state with small exhaust gas flow rate, the upstream side of the communication pipe 30 is provided at the position at which the axis of the connection part of the communication pipe 30 and the first processing unit 10 does not cross the axis of the first processing unit 10, whereby turbulence T caused by drift is generated inside the communication pipe 30 at the time that the exhaust gas flows from the outlet chamber 14 into the upstream side of the communication pipe 30 so as to promote the mixing of the urea water S.

Figure 3:
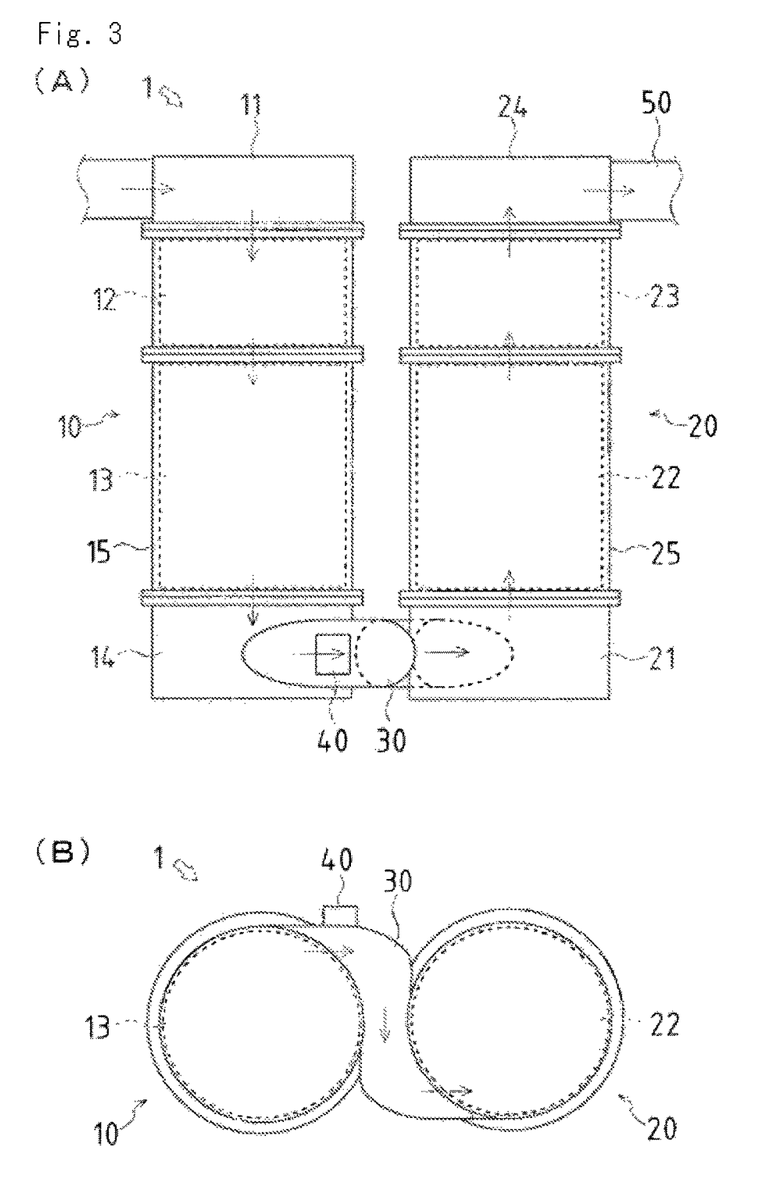
Figure 4:
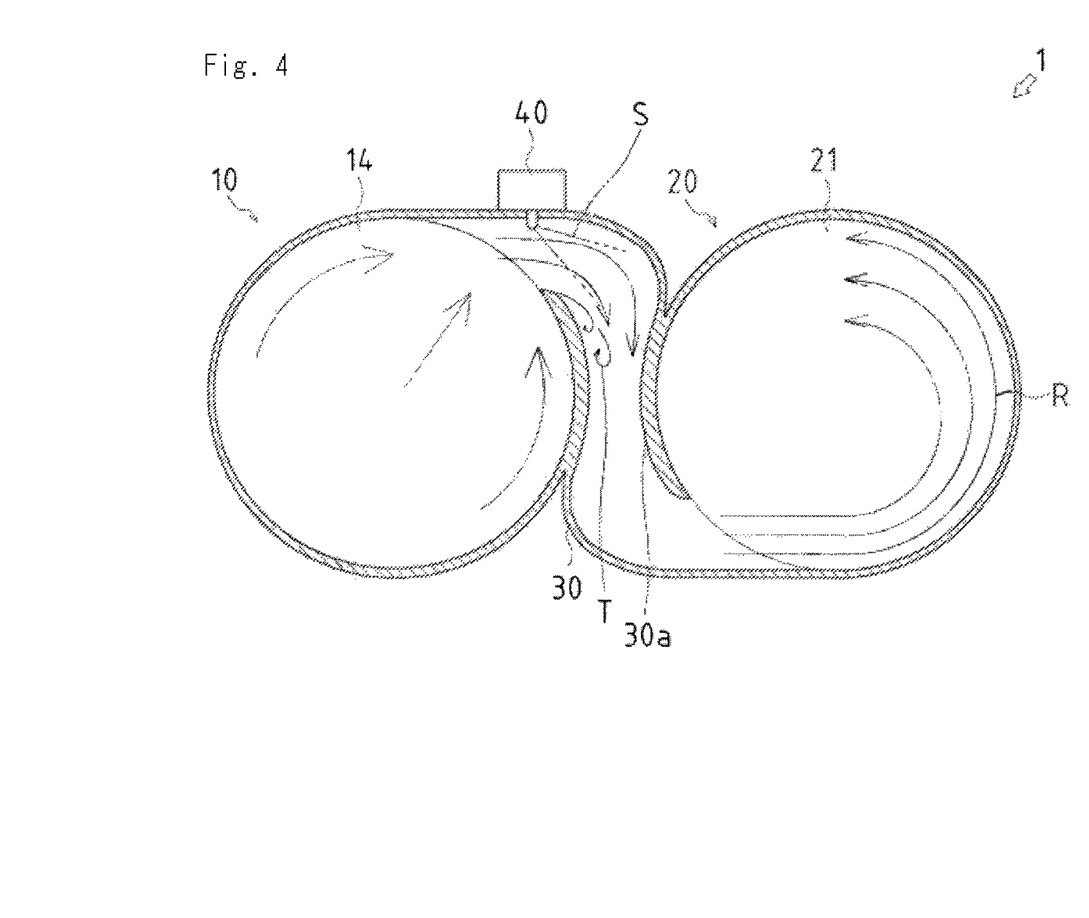
FIG. 4 is a sectional side view of the exhaust purification apparatus according to the second embodiment of the present invention.

Next, explanation will be given on the exhaust purification apparatus 1 according to a second embodiment of the present invention. FIG. 3 (A) is a plan view of the exhaust purification apparatus 1 according to the second embodiment of the present invention. FIG. 3 (B) is a side view of the exhaust purification apparatus 1. FIG. 4 is a sectional side view of the second embodiment. Members having the same constructions as those of the first embodiment are designated by the same reference numerals, and components different from the first embodiment are mainly described.

In the second embodiment, the construction of the first processing unit 10 and the second processing unit 20 is similar to that of the first embodiment.

Similarly to the first embodiment of the present invention, the upstream side of the communication pipe 30 is extended along the tangential direction of the first processing unit 10 while the axis of the communication pipe 30 at the connection part of the communication pipe 30 and the first processing unit 10 does not cross the axis of the first processing unit 10. The middle portion of the communication pipe 30 passes through the space between the first processing unit 10 and the second processing unit 20 at which the first processing unit 10 is the most close to the second processing unit 20. The downstream side of the communication pipe 30 is shifted to the position along the tangential direction of the second processing unit 20 while the axis of the communication pipe 30 does not cross the axis of the second processing unit 20, and is connected to the exhaust inlet provided in the inlet chamber 21 of the second processing unit 20.

In this case, the first processing unit 10 and the second processing unit 20 are closer to each other than those of the first embodiment. In the portion of the communication pipe 30 passing through the space between the first processing unit 10 and the second processing unit 20 at which the first processing unit 10 is the most close to the second processing unit 20, the section of the exhaust gas passage has smaller diameter than that of the first embodiment. Namely, as shown in FIG. 4, a reduced diameter portion 30a at which the diameter of the section of the exhaust path is contracted is provided at the middle portion of the communication pipe 30 positioned between the first processing unit 10 and the second processing unit 20.

The reducing agent supply unit 40 is provided at least at the upstream side of the reduced diameter portion 30a provided in the communication pipe 30 and supplies the urea water S to the exhaust gas. In this embodiment, the reducing agent supply unit 40 is arranged at the upstream side of the communication pipe 30 and in the vicinity of the exhaust outlet of the first processing unit 10.

Accordingly, in the second embodiment, the first processing unit 10 and the second processing unit 20 are arranged close to each other, whereby the exhaust purification apparatus 1 can be miniaturized further.

The exhaust gas to which the urea water S is supplied by the reducing agent supply unit 40 is contracted by the reduced diameter portion 30a and then expanded, whereby the evaporation and mixing of the urea water S can be promoted further. In the reduced diameter portion 30a positioned between the first processing unit 10 and the second processing unit 20, heat transmitted from the exhaust gas is hard to be dispersed so that respective high temperature can be maintained, whereby the evaporation of the urea water S can be promoted.

Furthermore, when the diesel engine is at low output driving state with small exhaust gas flow rate, the communication pipe 30 is provided so that the axis of the connection part of the communication pipe 30 and the first processing unit 10 does not cross the axis of the first processing unit 10, whereby the turbulence T caused by drift is generated inside the communication pipe 30. The turbulence T can be maintained at the upstream side of the reduced diameter portion 30a, whereby the urea water S can be mixed enough.

Figure 5:
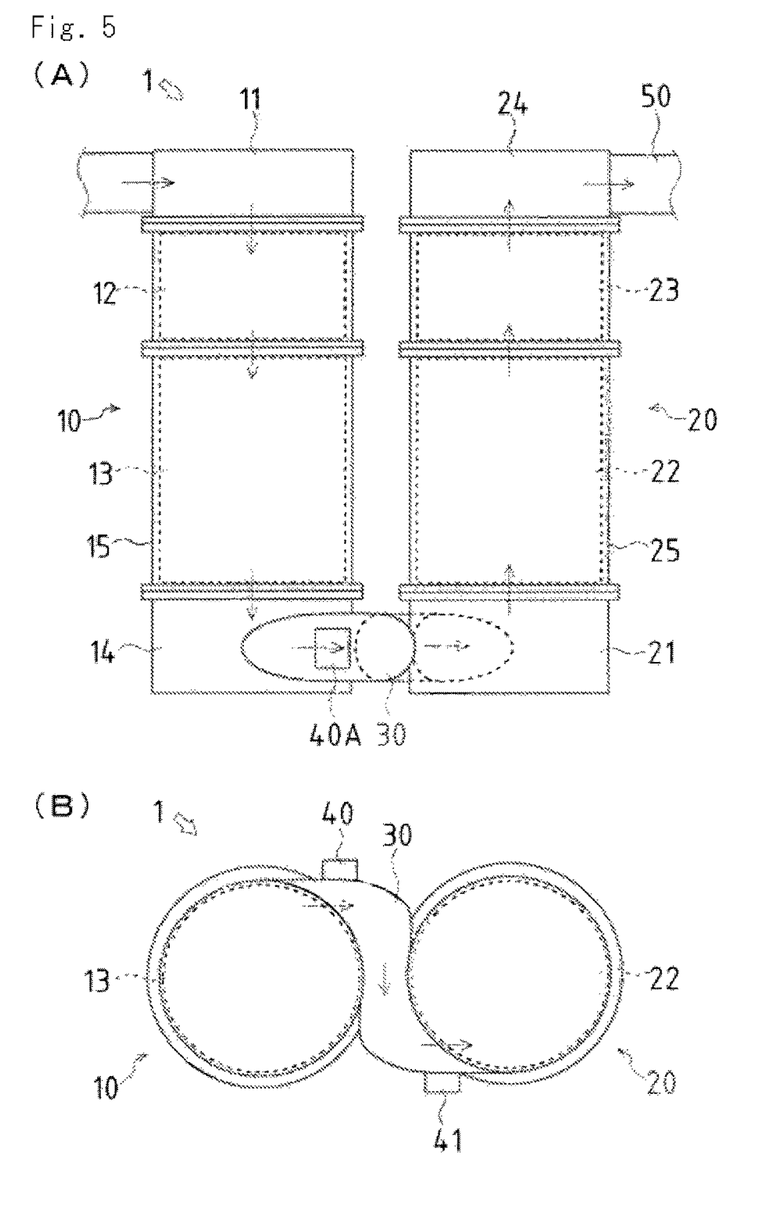
Figure 6:
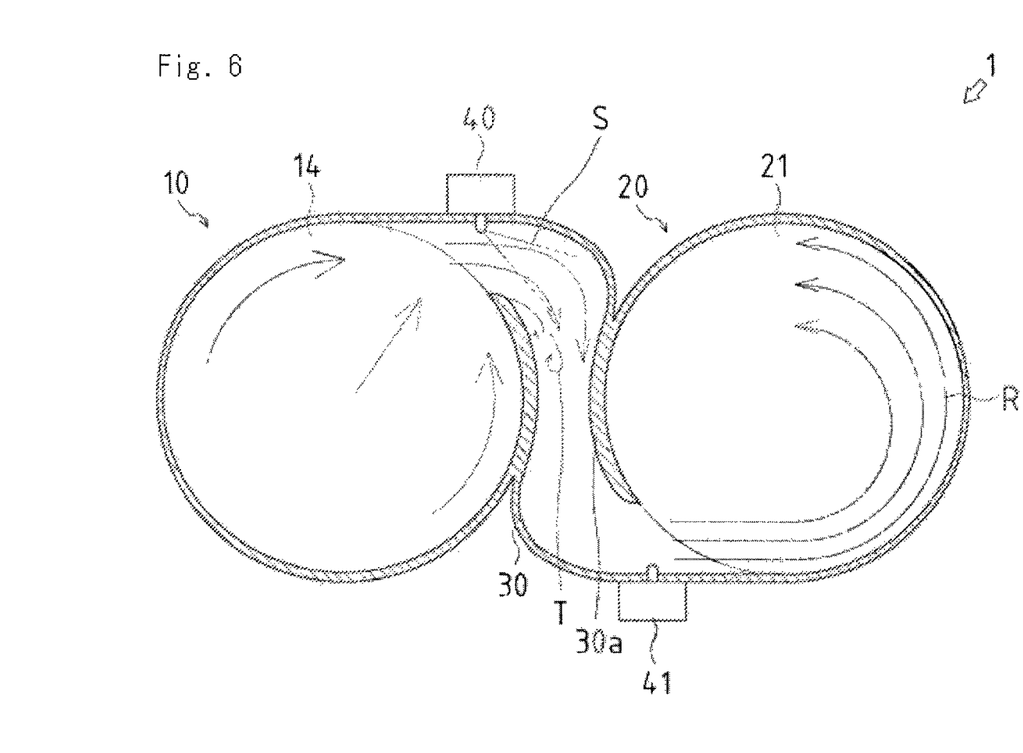
FIG. 6 is a drawing of supply of urea water to exhaust gas at the time of high output driving.
Figure 7:
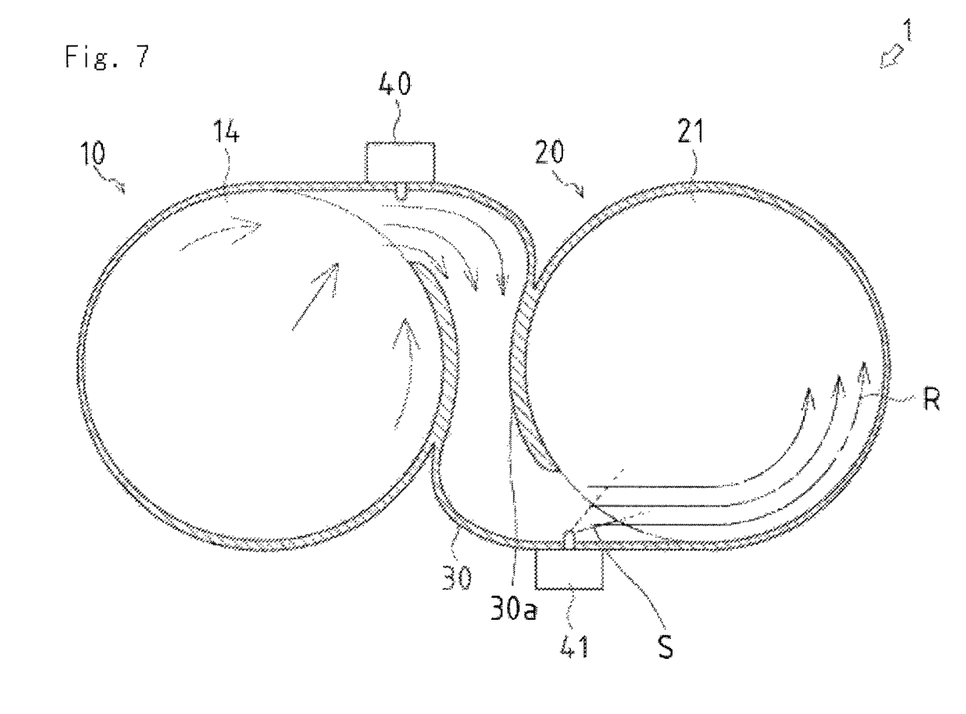
FIG. 7 is a drawing of supply of urea water to exhaust gas at the time of low output driving.

Next, explanation will be given on the exhaust purification apparatus 1 according to a third embodiment of the present invention. FIG. 5 (A) is the plan view of an exhaust purification apparatus 1 according to the third embodiment of the present invention. FIG. 5 (B) is a side view of the exhaust purification apparatus 1. FIG. 6 is a sectional side view of the third embodiment showing supply of the urea water S to exhaust gas at the time of high output driving. FIG. 7 shows supply of the urea water S to exhaust gas at the time of low output driving. Members having the same constructions as those of the first embodiment are designated by the same reference numerals, and components different from the first embodiment are mainly described.

In the third embodiment, the construction of the first processing unit 10 and the second processing unit 20 is similar to that of the first embodiment.

Similarly to the second embodiment of the present invention, the upstream side of the communication pipe 30 is extended along the tangential direction of the first processing unit 10 while the axis of the communication pipe 30 at the connection part of the communication pipe 30 and the first processing unit 10 does not cross the axis of the first processing unit 10. The middle portion of the communication pipe 30 passes through the space between the first processing unit 10 and the second processing unit 20 at which the first processing unit 10 is the most close to the second processing unit 20. The downstream side of the communication pipe 30 is shifted to the position along the tangential direction of the second processing unit 20 while the axis of the communication pipe 30 does not cross the axis of the second processing unit 20, and is connected to the exhaust inlet provided in the inlet chamber 21 of the second processing unit 20. Similarly to the second embodiment, the reduced diameter portion 30a at which the diameter of the section of the exhaust path is contracted is provided at the middle portion of the communication pipe 30 positioned between the first processing unit 10 and the second processing unit 20.

In this embodiment, in addition to the reducing agent supply unit 40, an auxiliary reducing agent supply unit 41 is provided which supplies the urea water S to exhaust gas similarly to the reducing agent supply unit 40. The reducing agent supply unit 40 is arranged in the vicinity of the exhaust outlet of the first processing unit 10 and at the upstream side of the communication pipe 30. The auxiliary reducing agent supply unit 41 is arranged in the vicinity of the exhaust inlet of the second processing unit 20 and at the downstream side of the communication pipe 30. Namely, the reducing agent supply unit 40 and the auxiliary reducing agent supply unit 41 are arranged respectively at the upstream side and the downstream side of the reduced diameter portion 30a of the communication pipe 30.

The auxiliary reducing agent supply unit 41 is constructed by a nozzle and the like and supplies the urea water S to exhaust gas. Supply amount of the urea water S from the auxiliary reducing agent supply unit 41 is controlled by a control device (not shown) corresponding to discharge amount of nitrogen oxide from the diesel engine. The auxiliary reducing agent supply unit 41 may supply the urea water S with air by employing compressed air or may supply only the urea water S by a pump, and the construction of the auxiliary reducing agent supply unit 41 is not limited in the present invention. Also, the direction of supply of the urea water S about the flow of exhaust gas is not limited.

The reducing agent supply unit 40 provided at the upstream side of the communication pipe 30 supplies the urea water S to exhaust gas at the time that exhaust gas flow rate from the diesel engine is large, that is, at the time of high output driving. At the time of the transient driving, the reducing agent supply unit 40 supplies the urea water S except for the case that the low output driving is maintained for fixed time.

That is because, as shown in FIG. 6, at the time of high output driving of the diesel engine, the discharge amount of nitrogen oxide is large so that the supply amount of the urea water S becomes large, and the exhaust gas flow rate discharged from the diesel engine is large so that the flow speed of the exhaust gas in the communication pipe 30 becomes high, whereby it is necessary to supply the urea water S by the reducing agent supply unit 40 provided at the upstream side of the communication pipe 30 so as to secure the mixing time until the exhaust gas including the urea water S is introduced into the SCR carrier 22.

At the time of the transient driving, in the high output driving area, the mixing time until the exhaust gas including the urea water S is introduced into the SCR carrier 22 can be secured. In the low output driving area, the mixing of the urea water S can be promoted by the turbulence T caused by drift is generated inside the communication pipe 30. Accordingly, in the whole driving area, the exhaust gas and the urea water S supplied thereto can be mixed well.

The auxiliary reducing agent supply unit 41 provided at the downstream side of the communication pipe 30 supplies the urea water S to exhaust gas at the time that exhaust gas flow rate from the diesel engine is small for fixed time, that is, at the time of low output driving.

Figure 8:
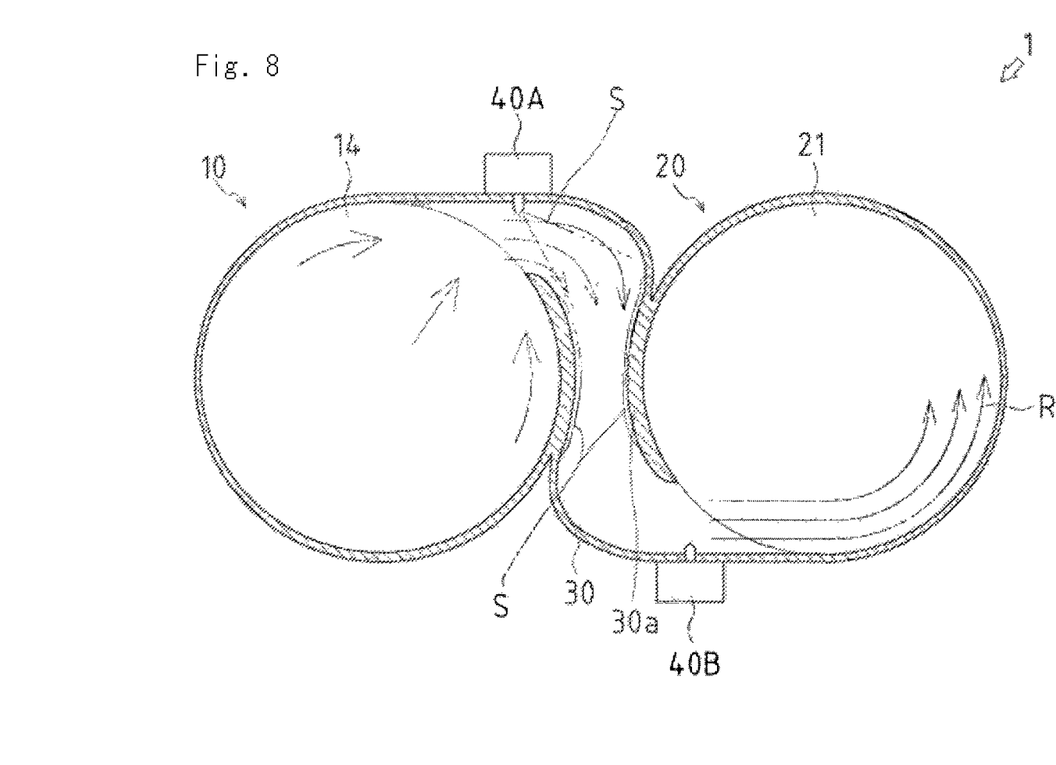
FIG. 8 is a drawing of the case that urea water is supplied from a reducing agent supply unit at the time of low output driving.

That is because, as shown in FIG. 8, in the case that the reducing agent supply unit 40 at the upstream side of the communication pipe 30 supplies the urea water S to exhaust gas for a long time at the time of low output driving of the diesel engine, the evaporation speed is low because the temperature of exhaust gas is low at the time of low output driving of the diesel engine, whereby the supply amount of the urea water S at the time of the transient driving is difficult to be controlled, and a large amount of the urea water S may adhere to the inner wall of the communication pipe 30 so as to cause separating.

Accordingly, the amount of ammonia as a reducing agent is insufficient about the discharge amount of nitrogen oxide, whereby the reduction reactions in the SCR carrier 22 may be insufficient.

Therefore, as shown in FIG. 7, at the time of low output driving of the diesel engine, the auxiliary reducing agent supply unit 41 provided at the downstream side of the communication pipe 30 supplies the urea water S to exhaust gas, whereby the urea water S is guided to the inlet chamber 21 of the second processing unit 20 without adhering to the inner wall of the communication pipe 30.

Accordingly, regardless of the driving state of the diesel engine, the urea water S of the amount suitable for the discharge amount of nitrogen oxide can be mixed with exhaust gas and then introduced into the SCR carrier 22. At the time of low output driving of the diesel engine, the discharge amount of nitrogen oxide is small so that the supply amount of the urea water S is small, whereby the mixing can be performed sufficiently when the urea water S is supplied by the auxiliary reducing agent supply unit 41 provided at the downstream side of the communication pipe 30.

Figure 9:
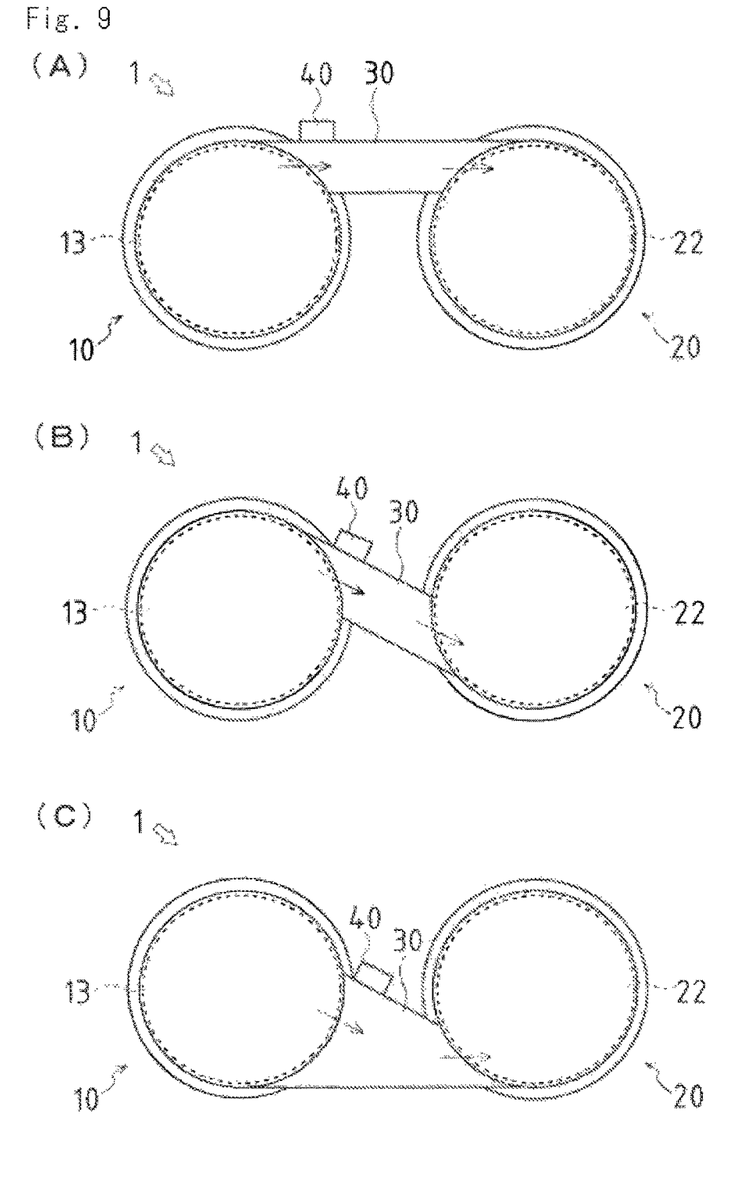

Next, explanation will be given on the exhaust purification apparatuses 1 according to other embodiments of the present invention. FIGS. 9 (A), (B) and (C) are side views of the exhaust purification apparatuses 1. Members having the same constructions as those of the first embodiment are designated by the same reference numerals and components different from the first embodiment are mainly described.

In this embodiment, the construction of the first processing unit 10 and the second processing unit 20 is similar to that of the first embodiment.

As shown in FIG. 9 (A), the communication pipe 30 is a cylindrical member whose axis is a straight line, and is arranged in parallel to a straight line for a predetermined interval, the straight line being perpendicular to the axes of the first processing unit 10 and the second processing unit 20. One of the ends of the communication pipe 30 is communicated with the outlet chamber 14 of the first processing unit 10 along the tangential direction of the first processing unit 10 while the axis of the communication pipe 30 does not cross the axis of the first processing unit 10. The other end of the communication pipe 30 is communicated with the inlet chamber 21 of the second processing unit 20 along the tangential direction of the second processing unit 20 while the axis of the communication pipe 30 does not cross the axis of the second processing unit 20.

In FIG. 9 (B), the communication pipe 30 is a cylindrical member whose axis is a straight line, and is arranged so that the axis of the communication pipe 30 crosses a straight line, which is perpendicular to the axes of the first processing unit 10 and the second processing unit 20, for a certain angle. One of the ends of the communication pipe 30 is communicated with the outlet chamber 14 of the first processing unit 10 along the tangential direction of the first processing unit 10 while the axis of the communication pipe 30 does not cross the axis of the first processing unit 10. The other end of the communication pipe 30 is communicated with the inlet chamber 21 of the second processing unit 20 along the tangential direction of the second processing unit 20 while the axis of the communication pipe 30 does not cross the axis of the second processing unit 20.

The reducing agent supply unit 40 is provided at least in the communication pipe 30 and supplies the urea water S to the exhaust gas. In this embodiment, the reducing agent supply unit 40 is arranged in the vicinity of the exhaust outlet of the first processing unit 10 and at the upstream side of the communication pipe 30.

Accordingly, the exhaust purification apparatuses 1 can be simplified further, whereby the mixing of the exhaust gas and the urea water S supplied thereto can be promoted and the bias of the exhaust gas guided to the SCR carrier 22 can be suppressed. By providing the reduced diameter portion 30a at which the diameter of the section of the exhaust path is contracted is provided at the middle portion of the communication pipe 30 in FIG. 9 (A) or (B), the evaporation and mixing of the urea water S can be promoted further.

In FIG. 9 (C), the communication pipe 30 is a tapered pipe whose section of the exhaust path is contracted gradually from one of the ends to the other end of the pipe. The end of larger diameter of the communication pipe 30 is communicated with the outlet chamber 14 of the first processing unit 10 while the axis of the communication pipe 30 does not cross the axis of the first processing unit 10. The end of smaller diameter of the communication pipe 30 is communicated with the inlet chamber 21 of the second processing unit 20 while the axis of the communication pipe 30 does not cross the axis of the second processing unit 20.

The reducing agent supply unit 40 is provided at least in the communication pipe 30 and supplies the urea water S to the exhaust gas. In this embodiment, the reducing agent supply unit 40 is arranged in the vicinity of the exhaust outlet of the first processing unit 10 and at the upstream side of the communication pipe 30.

Accordingly, exhaust gas can be guided into the second processing unit 20 while accelerating the flow rate without the sudden contraction of the section of the exhaust path at the time of introducing the exhaust gas into the communication pipe 30 which inhibits the flow of the exhaust gas. Therefore, the turning flow R in the inlet chamber 21 of the second processing unit 20 is strengthened, whereby the mixing of the urea water S can be promoted and the bias of the exhaust gas guided to the SCR carrier 22 can be suppressed.

INDUSTRIAL APPLICABILITY

The present invention can be employed for an exhaust purification apparatus of a diesel engine.

The invention claimed is:

1. An exhaust purification apparatus provided in an exhaust path of a diesel engine, comprising:
    a first processing unit which is a substantially cylindrical exhaust path provided therein with a filter carrier and removes mainly particulate matter from exhaust gas of the diesel engine;
    a second processing unit which is a substantially cylindrical exhaust path provided therein with a reduction catalytic carrier and removes mainly nitrogen oxide from the exhaust gas after passing through the first processing unit;
    a communication pipe which guides the exhaust gas from an exhaust outlet provided in a peripheral surface of the first processing unit to an exhaust inlet provided in a peripheral surface of the second processing unit; and
    a reducing agent supply unit which supplies reducing agent to the exhaust gas so as to reduce the nitrogen oxide,
        wherein the first processing unit and the second processing unit are provided in parallel to each other while the exhaust outlet faces the exhaust inlet,
        wherein the reducing agent supply unit is provided in the communication pipe,
        wherein the upstream side of the communication pipe is provided from the exhaust outlet of the first processing unit along the outer perimeter of the first processing unit, the communication pipe passes through a space between the first processing unit and the second processing unit at which the first processing unit is the most close to the second processing unit, and the downstream side of the communication pipe is connected to the exhaust inlet of the second processing unit along the outer perimeter of the second processing unit, and
        wherein the communication pipe has a reduced diameter portion, in which a diameter of a section of an exhaust gas passage is contracted, in a middle portion positioned between the first processing unit and the second processing unit.

2. The exhaust purification apparatus according to claim 1, wherein the reducing agent supply unit is provided at the upstream side of the reduced diameter portion of the communication pipe.

3. The exhaust purification apparatus according to claim 1, wherein the first processing unit and the second processing unit are formed integrally in the reduced diameter portion of the communication pipe.

4. The exhaust purification apparatus according to claim 1, further comprising:
    an auxiliary reducing agent supply unit which supplies a reducing agent to the exhaust gas so as to reduce the nitrogen oxide,
    wherein the reducing agent supply unit is provided at the upstream side of the communication pipe, and
    wherein the reducing agent is supplied from the auxiliary reducing agent supply unit to the exhaust gas at a time of low output driving of the diesel engine.

* * * * *